United States Patent [19]
McWherter

[11] Patent Number: 5,218,536
[45] Date of Patent: Jun. 8, 1993

[54] ELECTRONIC SPELLING MACHINE HAVING ORDERED CANDIDATE WORDS

[75] Inventor: David McWherter, Bensalem, Pa.

[73] Assignee: Franklin Electronic Publishers, Incorporated, Mt. Holly, N.J.

[21] Appl. No.: 459,942

[22] Filed: Jan. 2, 1990

Related U.S. Application Data

[63] Continuation-in-part of Ser. No. 199,060, May 25, 1988, Pat. No. 5,113,340.

[51] Int. Cl.⁵ ............................................. G06F 15/38
[52] U.S. Cl. ................................................... 364/419
[58] Field of Search ....................... 364/419, 900, 200; 395/600; 400/61, 62, 63, 66

[56] References Cited

U.S. PATENT DOCUMENTS 4,453,217  6/1984  Boivie ................................. 395/600
4,797,855  1/1989  Duncan et al. ..................... 364/419

*Primary Examiner*—Robert A. Weinhardt
*Assistant Examiner*—Khai Tran
*Attorney, Agent, or Firm*—McAulay Fisher Nissen Goldberg & Kiel

[57] ABSTRACT

A spelling corrector develops a phonetic correction candidate list and a typographic correction candidate list. These lists are merged using similarity values that measure the degree of similarity between the query (input) word and each word on the candidate lists. The similarity values include one based on phonetic comparison one based on typographic (ASCII, for example) comparison, one based on a vowel and consonant typographic pattern comparison and one based on a consonant phonetic comparison.

11 Claims, 3 Drawing Sheets

SIMILARITY CHARACTERISTICS (THETA) FOR CANDIDATE WORDS

|  | ON PHONETIC LIST 22 | ON TYPOGRAPHIC LIST 24 |
|---|---|---|
| PHONETIC THETA | P1 | P2 |
| ASCII THETA | A1 | A2 |
| VOWEL & CONSONANT PATTERN THETA | V1* | V2* |
| ESSENCE THETA | E1 | — |

\* USED ONLY FOR RANK CALCULATION

CLASS DEFINITIONS

MINIMUM REQUIREMENTS FOR INCLUSION

| CLASS | FOR PHONETIC CANDIDATES | FOR TYPOGRAPHIC CANDIDATES |
|---|---|---|
| 0 | P1 AND A1 = 126 | A2 AND P2 = 126 |
| I | P1 AND E1 = 126 | VOWEL TRANSPOSITION - STEP 30 |
| II | P1 AND E1 ≥ 120 AND PHONETIC CODE COMPARISON - STEP 29 | VOWEL SUBSTITUTION/ADDITION/DELETION - STEP 31 |
| III | P1 ≥ 96 | A2 ≥ 96 |
| IV | P1 ≥ 64 | A2 ≥ 64 |
| V | P1 ≥ 32 | A2 ≥ 32 |
| VI | REMAINING CANDIDATES | REMAINING CANDIDATES |

RANK CALCULATIONS

PHONETIC CANDIDATE RANK = $\frac{1}{4}(P1 + A1 + V1 + E1)$

TYPOGRAPHIC CANDIDATE RANK = $\frac{1}{3}(P2 + A2 + V2)$

ELECTRONIC SPELLING MACHINE HAVING ORDERED CANDIDATE WORDS

REFERENCE TO RELATED APPLICATIONS

This application is a continuation-in-part of patent application Ser. No. 199,060 entitled Electronic Spelling Machine filed on May 25, 1988, now, U.S. Pat. No. 5,113,340 issued May 12, 1992.

BACKGROUND OF THE INVENTION

This invention relates to an improved electronic spelling machine and in particular to one having an enhanced ability to compare an input query word against a set of words stored in memory.

The utility of hand held electronic spelling machines is essentially in their ability to provide an appropriate list of suggested matches against a query word and to do so in a minimum of time. Utility is enhanced if the words presented are ranked in an order that presents the most likely word or spelling being sought.

One way of providing a fairly extensive list without overwhelming the user is to provide a list of candidates for the query word ranked in such a way that the most likely match is at the top of the list and the likelihood of the match being the one sought decreases as the user scrolls down the list. In this fashion, the user typically finds the word being sought immediately and only infrequently has to scroll further down the list of candidate words in order to find the appropriate word.

Closely related to this issue of providing a meaningful ranked list of words is the question of providing both typographic corrections and phonetic corrections. That is, a query word is put through a first process which provides a list of candidate words based on the assumption that there is a typographic error in the query word. The query word is also put through a different type of matching process in which the assumption is made that there are phonetic errors in the input word. For example, spelling "bell" as either "ball" or as "bel" represents a typographic kind of error. By contrast, spelling "foreign" as "forun" is a phonetic type of error.

In any case it is known in the art to provide a correction pass which performs a phonetic type of correction and another correction pass which performs a typographic type of correction. These two passes provide two lists of candidate words, specifically a list of good phonetic matches and a list of good typographic matches.

Ranking the words in these two lists and merging them into a single list provides an enhanced result for a user in that on the average it materially decreases the time it takes the user to find the desired correctly spelled word.

Accordingly, the purpose of this invention is to provide a hand held electronic spelling device which provides a candidate list for a query word, which list merges the typographic correction list and the phonetic correction list and which orders the words in the merged list in a enhanced fashion in terms of value to the user.

A preferred embodiment of the invention employs the enhanced technique for encoding strings as disclosed in the above referenced, U.S. Pat. No. 5,113,340.

U.S. Pat. No. 4,490,811 dated Dec. 25, 1984 and entitled String Comparator Device System Circuit and Method discloses a string comparator technique of the sort with which the improvement of this invention operates. Applicant's references herein to a word similarity characteristic is to the string comparison function theta disclosed in the '811 patent. For convenience this function is called the theta function herein.

BRIEF DESCRIPTION OF THE FIGURES

FIG. 3 is a chart identifying the theta values designated in FIG. 2 and indicating the class boundaries that determine into which class a particular candidate word is placed. FIG. 3 is to be viewed in connection with FIG. 2.

DESCRIPTION OF THE PREFERRED EMBODIMENTS

Figure 1:
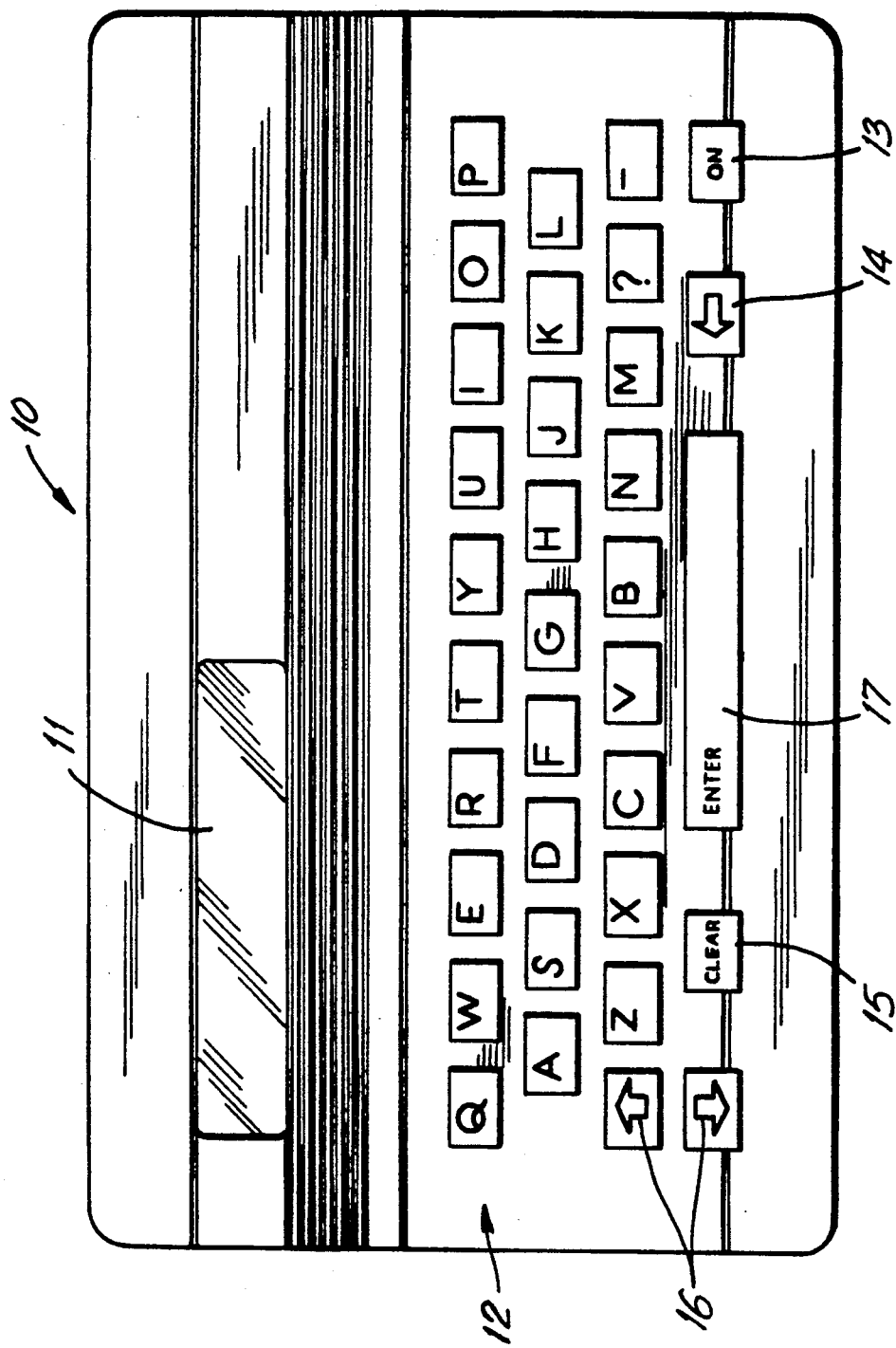
FIG. 1 is a plan view of a device that incorporates the improvement of this invention.

FIG. 1 is similar to FIG. 4 of the parent application. The preferred technique of selecting candidate words from memory based on a query word is the technique disclosed in the above-referenced U.S. Pat. No. 4,490,811 and U.S. Pat. No. 5,113,340. The hand held device which embodies the present invention is a self-contained, battery operated, readily portable, hand holdable device 10 having a one line LCD character display 11 and a keyboard 12. The keyboard 12 includes keys for the twenty-six letters of the alphabet. In addition, it has an on switch 13 and a back space key 14. The clear key 15 clears the display and permits the user to initiate query words. The two keys 16 are scroll keys permitting the use to scroll back an forth through the word list that has been developed. The enter key 17 is actuated after the query word has been completed so the device will perform the search function. This involves a tre traverse to provide a phonetic candidate list ranked in accordance with a phonetic similarity characteristic (a phonetic theta value) and to provide a typographic candidate list ranked in accordance with a typographic similarity function (an ASCII theta value).

Figure 2:
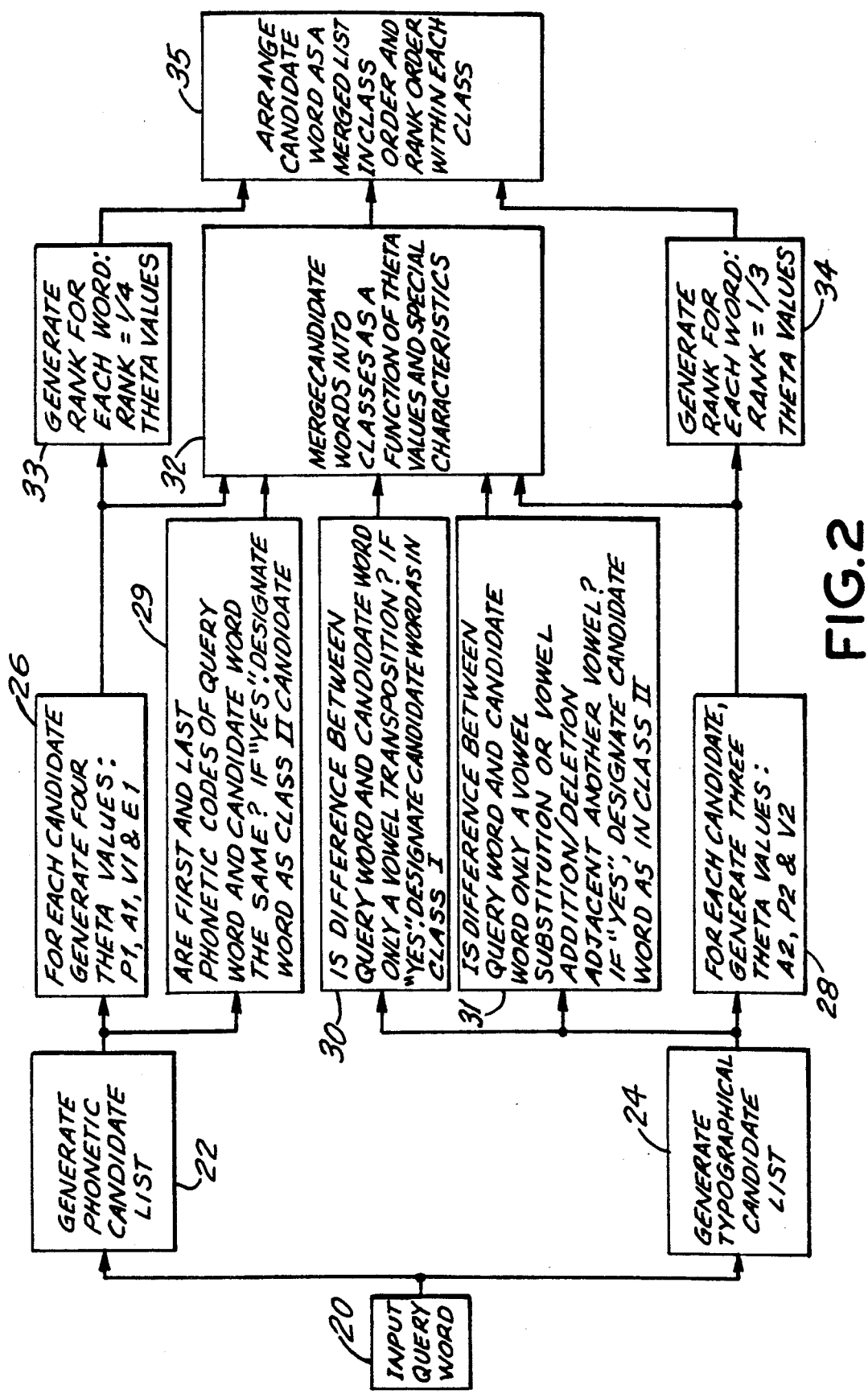
FIG. 2 is a block and flow diagram indicating the sequence and relationship of the steps involved in merging the phonetic candidate list of words with the typographic candidate list of words.

FIG. 2 is a chart designating the processing flow of the word strings being compared and classified and ranked.

A query word is input at step 20. The query word is then compared against the set of words in memory by a first known type of processing step to provide a list of candidates based on a phonetic comparison of the query word with the words in memory. This produces the phonetic list of candidate words 22.

A list of typographical candidates is also provided is indicated at stage 24. This list is generated by means of a known type of typographic comparison between the query word and the set of words in memory.

In this fashion, both a typographic candidate list and a phonetic candidate list are prepared. These two lists may be generated by any one of a number of different known techniques. Normally the number of words in the list is limited to a predetermined number with the highest similarity function.

The similarity function values are calculated for each candidate word in each of two lists 22, 24. These similarity values are calculated by a technique disclosed in the U. S. Pat. No. 4,490,811 and, in a preferred embodiment, incorporate the techniques further disclosed in U.S. Pat. No. 5,113,340. The similarity function is the theta value mentioned in the '811 patent. It will be convenient herein to call the similarity value, a theta value.

As indicated in the stage 26, there are four separate theta values calculated for each word on the phonetic candidate list and, as indicated at stage 28, there are three separate theta values indicated for each word in the typographic candidate list.

A phonetic theta, designated P1 or P2 is a similarity evaluation of the fully encoded phonetic strings. That is, the fully encoded query string and the fully encoded candidate string are compared to provide the theta value P1 of a candidate from the phonetic list and the theta value P2 of a candidate from the typographic list. In principle, there is no difference between P1 and P2 except that the two designate which list the theta value derives from.

An ASCII theta designated A1 or A2 is a theta evaluation of the ASCII character strings. This is a comparison of the ASCII string of the query word and the ASCII character string of the candidate word. The ASCII string is the string of letters that make up the word.

Again, there is no difference in the technique of calculating A1 and A2 theta values except that A1 designates those values for candidate words on the phonetic list and A2 designates those values for candidate words on the typographic ist 24.

A vowel and consonant pattern theta designated V1 or V2 is a theta evaluation of the vowel and consonant patterns of the ASCII strings. In this theta, only the pattern of the vowels and consonants in the words being compared are important. Thus the words are converted to strings representing only vowel and consonant pattern information before the similarity comparison is made. All the vowels are used as is and all the consonants in the world are converted to the later "M". For example, the V1 or V2 theta for the words "hello" and "hallow" are determined by converting these words to memmo and mammom. It is the ASCII strings for these two words which are compared to provide the value of V1 or V2.

Finally, there is an essence theta E1 which is calculated only for candidate words on the phonetic list 22. This essence theta E1 is the similarity evaluation of the essence only phonetic string. That is all of the vowels are deleted from the phonetic strings of the two words being compared. The two words being compared ar the query word and the candidate word from the phonetic list 22.

These theta values, indicated at 26 and 28, are employed as the main factor in creating the merged list. Each candidate word from the phonetic list 22 and the typographic list 24 is placed in one of seven classes, class zero through class VI, depending upon the theta values involved as well as three other particular characteristics of certain words as set forth at blocks 29, 30 and 31.

More particularly, as indicated at block 32, the candidate words from the lists 22 and 24 are merged into classes as function of the theta values set forth at 26 and 28 as well as a function of certain special characteristics set forth at 29, 30 and 31.

Class Zero

Class zero indicates the most likely candidate and a word from the lists 22 and 24 is placed in class zero if it has the highest possible theta value, which in the embodiment disclosed herein is the value of 126. Thus if the phonetic theta P1 and the ASCII theta A1 for a word in the phonetic list are both 126, then that candidate word is placed in class zero. Similarly if the ASCII theta A2 and the phonetic theta P2 for a candidate word on the typographic list are also both 126, then that word is placed in class zero.

Class I

Class I represents a situation where there is a very high degree of matching.

For a word on the phonetic list 22, if its phonetic theta P1 is 126 and its essence theta E1 is 126, it qualifies for class I.

A word on the typographic list 24 becomes a member of class I, as indicated at box 30, if the only difference between the candidate word and the query word is a vowel transposition. For example, if the query word is "neice", the typographic 24 list will show as one of the candidate words "niece". Since the latter word only involves a vowel transposition of the query word, that word is placed into class I.

Class II

Class II is a group of candidate words that are the next most likely set of words to be sought by the user as the word corresponding to the input query word. In class II, the criteria for the words on the phonetic list 22 is quite different from the criteria for the words on the typographic list.

As indicated at stage 30, a word from the typographic list 24 is deemed to be in class II if the list word involves either a vowel substitution as compared with the query word or a vowel addition or deletion adjacent to a vowel in the query word. For example, if the query word is "ball", the typographic list 24 would include "bell". Since this involves a vowel substitution for the query word, the list word "bell" would be designated as being class II. Similarly, if the query word were "nice" one of the typographic list 24 words would be "niece". That involves the addition of a vowel adjacent to another vowel and thus qualifies "niece" as a class II word. Similarly, if the query word were "niece", then the typographic list word "nice" would qualify as a class 11 member because it involves only the deletion of a vowel adjacent to another vowel.

Candidate words from the phonetic list 22 qualify for class II if the phonetic theta P1 is equal to or greater than 120 and also if the essence theta E1 is equal to or greater than 120. Of course, these criteria only apply to words which have not already been classified into higher classes. However for this phonetic list 22 word to qualify in class II, a third requirement set forth in stage 29 must also be met.

This third requirement which must be met in order to be in class II is that the word (on the phonetic list) must have its first and last phonetic code identical with the first and last phonetic code of the query word. That is the criterion set forth at stage 29 and is one of the characteristics that has to be processed by the merge algorithm of stage 32 in order for a list 22 candidate word to satisfy a class II set membership.

Classes III-VI

The remaining classes involve less likely candidate words and involve a somewhat simpler classification algorithm. Thus, those words on the list 22 and 24 which have not been classified in the higher class as zero, I and II, would be classified in class III if either the phonetic theta P1 of a word on the list 22 or the ASCII theta A2 of a word on the typographic list 24 have a value equal to or greater than 96.

Similarly, for the remaining words on the two lists 22, 24, if either P1 of A2 are equal to or greater than 64, the candidate word would qualify to be in class IV. And for the remaining words if the P1 or A2 are equal to or greater than 32, the candidate word would qualify to be in class V. Finally all the remaining candidate words, if any would qualify for class VI.

In addition, to the class designation of each word on the list 22, 24 which is effected at stage 32, each word on the list 22, 24 are given a rank value. As indicated at stage 33, the rank value for each word on the phonetic list 22 is one-fourth of the sum of the four theta values B1, A1, V1 and E1 which are calculated for the word. The rank value for each word on the typographic list 24 is, as indicated at stage 34, is one-third of the value of the sum of the three theta values P2, A2 and V2 which are calculated for each word on the list 24.

These rank values determine the sequence of the listing of the word within each class but do not affect class membership. All words in class II are listed in rank value with the higher rank words being listed first. Because class membership takes priority over rank value, a word in class II with a rank value greater than a word in class I would appear later in the merge list than would the word in class I. This final arrangement of candidate words as a merged list in class order first and in rank order within each class is the output, indicated at stage 35, which is made available to the user by being called up on the screen and scrolled through from most likely word to least likely word.

The phonetic correction candidate list 22 tends to be a more significant or important list than is the typographic correction candidate list 24. Thus it would not be desirable to simply interleave alternate members of the two lists 22 and 24 in terms of their rank order on their respective lists. However, there are frequently cases where the typographic candidate is highly likely to be the sought for word because of the nature of the typographic error. By and large, such are cases where there are vowel substitutions or vowel inversions or vowel addition or vowel deletion next to another vowel.

Wha the above described technique does by creating certain classes which have priority over the similarity function rank calculations is to make it possible to strongly weight the final arrangement in favor of the better phonetic list 22 candidates and yet incorporate in the uppermost members of the merged list the most likely ones of the typographic list candidates.

Thus, a typographic list 24 candidate which has a maximum phonetic similarity function (theta=126) and a maximum ASCII similarity value (theta=126) will be placed in class Zero. In addition, the vowel substitution and correction arrangements set forth at stages 30 and 31 will cause typographic candidate from list 24 to be placed in the uppermost classes I or II.

The arrangement then in classes III through VI is substantially a function of the phonetic similarity function of phonetic candidates and the ASCII similarity function of typographic candidates.

The key merging stage is indicated at block 32. This involves the placing of each candidate word into a class. The class is determined as a function of the special characteristics set forth in decision steps 29, 30 and 31. That is, for all candidate words which meet the criteria of decision steps 29, 30 and 31, a determination of class I or class II is decided. For all other candidate words, which would be the vast majority of candidate words, the class designation for the word is determined by the theta values for the word in accordance with the criteria indicated below. It should be kept in mind that class designations are mutually exclusive and that a word is placed in the highest class to which it is eligible. For example, a candidate word which qualifies for class II is placed in class II even though it would qualify for the criteria set forth in classes III through VI below. Thus, the criteria set forth in the chart below are the criteria for the floor of the class involved. The ceiling of the class involved is the floor of the class immediately above.

In a preferred embodiment, although not specifically indicated in the FIGs, if the same candidate word is on the phonetic list and the typographic list, it is only incorporated in the merged list onc and it is incorporated in a position determined by whatever is the higher class for which it qualifies.

It should be recognized that one of the similarity characteristics (theta value) is calculated for each word during the search routing to determine if the word should be put into the candidate list 22 or 24. It is the phonetic similarity function that is calculated to determine if a word is to be placed on the phonetic list 22 and the ASCII similarity function which is calculated to determine if a word is to be put on the typographic list 24. In on embodiment each of those lists is limited to seven candidates so that a total of, at the most, fourteen words have to be considered for this merge routine. In such a case, the sensitivity of the routine for those words at the bottom of the list is less significant than is the sensitivity of the routine for the words at the top of the list. That is, it is important for the user to very often find the word being sought as one of the first two or three words on the list. This is why the routine for classification in classes I and II is relatively complex.

The maximum value for the similarity characteristic theta can be programmed to be any desired value and the threshold values which qualify a candidate word for a particular class can be set as desired. To some extent, the relative threshold values will be a function of the maximum number of words that can be on the candidate lists 22 and 24. It is important from the point of view of user convenience to have appreciable discrimination in connectlon with class Zero, I and II. The threshold values for the similarity characteristics theta that are described herein is to provide one example of relative values which have been found useful in a practical embodiment.

The ranking within the classes is of importance because what happens is that there are situations where, depending on the query word, a substantial number of candidate words appear in a given class. Experience shows that there is a better ranking within that class if the theta values other than the primary theta value P1 or A2 are given some weight.

This invention has been described in the context of certain types of strings and in particular phonetic strings and ASCII strings. It should be understood that the ASCII string refers to one particular typographic string and that this invention can be used with any type of typographic string including, for example, the EBCDIC string which is the IBM standard. It should also be understood that the phonetic string employed may be any one of the phonetio strings available to those in this art which have been used to provide phonetic encoding. Since the invention is not limited to any particular phonetic string encoding or alpha-numeric character string encoding, such are not described in any greater detail herein.

Attached hereto as Appendix A is a presently preferred listing in C Source Code. This listing is by way of a example of the routines for implementing the merge functions of this invention. A skilled programmer may implement the invention by means of a different code listing.

What is claimed is:

1. In an electronic machine spelling corrector to provide an output list of candidate words in response to an input query word, the method of merging a list of phonetic correction candidate words with a list of typographic correction candidate words to provide a single merged output list for presentation to a user, comprising:

for each candidate word on the phonetic list, providing a first set of similarity values including a first value P1 vased on a phonetic comparison of the candidate word with the query word and a second value A1 based on a typographic comaprison of the candidate word with the query word, for each candidate word on the typographic list, providing a second set of similarity values including a third value P2 based on a phonetic comparison of the candidate word with the query word and a fourth value A2 based on a typographic comparison of the candidate word with the query word, merging candidate words on the phonetic list and typographic list into the output list, and ordering said candidate words on said merged list as a partial function of said four similarity values.

2. The method of claim 1 including the steps of:

calculating an average of said similarity values for each of said candidate words from said phonetic and typographic lists, and wherein:

said step of ordering includes using said averages as a partial basis for determining the position of the candidate word on the merged list.

3. The method of claim 1 further comprising the steps of:

for each candidate word on the phonetic list, including in said first set of similarity values, a fifth similarity value E1 based on an essence comparison of the consonants of the candidate word with the consonants of the query word, assigning to a first priority class, (a) candidate words from said phonetic list wherein said first similarity value P1 and said second similarity value A1 indicate a perfect match with the query word and (b) candidate words from said typographic list wherein said third similarity value P2 and said fourth similarity value A2 indicate a perfect match with the query word, assigning to a second priority class, (a) candidate words from said phonetic list wherein said first similarity value P1 and said fifth similarity value E1 indicate a perfect match with the query word and (b) candidate words from said typographic list which have a vowel transposition compared to the query word, assigning to a third priority class, (a) candidate words from said phonetic list wherein (i) said first value P1 exceeds a first predetermined threshold and (ii) said fifth value E1 exceed a second predetermined threshold and (iii) the first and last phonetic codes of the candidate words and the query words are the same, and (b) candidate words from said typographic list, have either (i) a vowel substitution compared to the query word or (ii) have a vowel addition adjacent to another vowel in the query word or (iii) a vowel deletion adjacent to another vowel in the query word, and assigning to one or more lesser priority classes, those words wherein (a) said first similarity value P1 exceeds a predetermined threshold or (b) said fourth similarity value A2 exceeds a predetermined threshold.

4. The method of claim 3 including the steps of:

calculating an average of said similarity values for each of said candidate words from said phonetic and typographic lists, and ordering said candidate words on said merged list within each of said priority classes as a function of said averages.

5. The method of claim 3 further comprising the steps of:

for each candidate word on said phonetic list, including in said first set of similarity values, a sixth similarity value V1 based on a vowel and consonant pattern comparison of the candidate word with the query word, for each candidate word on said typographic list, includign in said second set of similarity values, a seventh similarity value V2 based on a vowel and consonant pattern comparison of the candidate word with the query word, calculating an average of said similarity values for each of said candidate words from each of said lists, and ordering said candidate words within each of said priority classes as a function of said averages.

6. In an electronic machine spelling corrector which provides an output list of candidate words in response to an input query word, the output list being the merger of a list of phonetic correction candidate words and a list of typographic correction candidate words comprising:

a first class of words comprising (a) candidate words from said phonetic list wherein a phonetic comparison of the candidate word with the query word and a typographic comaprison of the candidate word with the query word indicates a perfect match, and (b) candidate words from said typographic list wherein a phonetic comparison of the candidate word with the query word and a typographic comparison of the candidate word with the query word indicates a perfect match, a second class of words excluding words in said first class comprisign (a) candidate words from said phonetic list whereni a phonetic comparison of the candidate word with the query word and an essence comparison of the candidate word with the query word indicates a perfect match, and (b) candidate words from said typographic list which have a vowel transposition compared to the query word, a third class of words excluding words in said first and second classes and comprising (a) words from said phonetic list wherein (i) a phonetic comparison of the candidate word with the query word and an essence comparison of the candidate word with the query word exceed a pre-determined threshold and (ii) the first and last phonetic codes of the candidate word and the query word are the same, and (b) candidate words from said typographic list which have a vowel substitution compared to the query word or which have a vowel addition or a vowel deletion adjacent to another vowel in the query word, and at least a fourth class of words excluding words from said first, second and third classes and comprising those candidate words from said phonetic list whose phonetic comparison with the query word exceeds a predetermined threshold and those candidate words from said typographic list whose typographic comparison with the query word exceeds a predetermined threshold.

7. The output list of claim 6 wherein:

position within each of said classes is determined by an average of comparison values calculated from each of said phonetic, typographic and essence comparisons.

8. The otuput list of claim 7 wherein:

said average of comparison values includes a comparison value based on a vowel and consonant pattern comparison of the candidate word with the query word.

9. In an electronic machine spelling corrector, the output list of candidate words in response to an input query word, the output list being the merger of a list of phonetic correction candidate words and a list of typographic correction candidate words, comprising:

a first set of candidate words comprisign candidate words from said phonetic list and said typographic list where the phonetic code and typographic code for the candidate word are substantially identical to the phonetic code and typographic code for the query word, a second set of candidate words comprising:
 (a) candidate words from the phonetic list where the phonetic code and the essence code for the candidate words are substantially identical to the phonetic code and the essence code for the query word, and
 (b) words from said typographical list where the only difference between the candidate word and the query word is a vowel transposition, said second set excluding all words in said first set, a third set of candidate words comprising:
 (a) candidate words from the phonetic list which meet the three criteria that (i) a comparison of the phonetic codes of the candidate word and query word exceed a first predetermined value, (ii) a comparison of the essence codes of the candidate word and the query word exceed a second predetermined value, and (iii) the first and last phonetic codes of the candidate word and query word are identical, and
 (b) candidate words from said typographic list which have either (i) a vowel substitution as comapred with the query word or (ii) a vowel addition or deletion adjacent to a vowel in the query word, said third set excluding all words in aid first and second set, and a fourth set of candidate words comprising:
 (a) words from said phonetic list whose phonetic code comparison with the phonetic code of the query word provides a comparison value that exceeds a predetermined value, and
 (b) words from said typographic code whose typographic code comparison with the typographic code of the query word exceeds a second predetermined value, said fourth set excluding all words in said first, second or third sets.

10. The output list of claim 9 wherein:

position within each of said sets is determined by an average of comparison values calculated from each of said phonetic, typographic and essence comparisons.

11. The output list of claim 10 wherein:

said average of comparison values includes a comparison value based on a vowel and consonant pattern comparison of the candidate word with the query word.

* * * * *